Jan. 8, 1957  T. ZBIKOWSKI  2,776,790
MOTORCYCLE LUGGAGE CARRIER
Filed April 4, 1956  2 Sheets-Sheet 1

INVENTOR.
TED ZBIKOWSKI
BY Cullen & Canton
ATTORNEY

Jan. 8, 1957 T. ZBIKOWSKI 2,776,790
MOTORCYCLE LUGGAGE CARRIER
Filed April 4, 1956 2 Sheets-Sheet 2
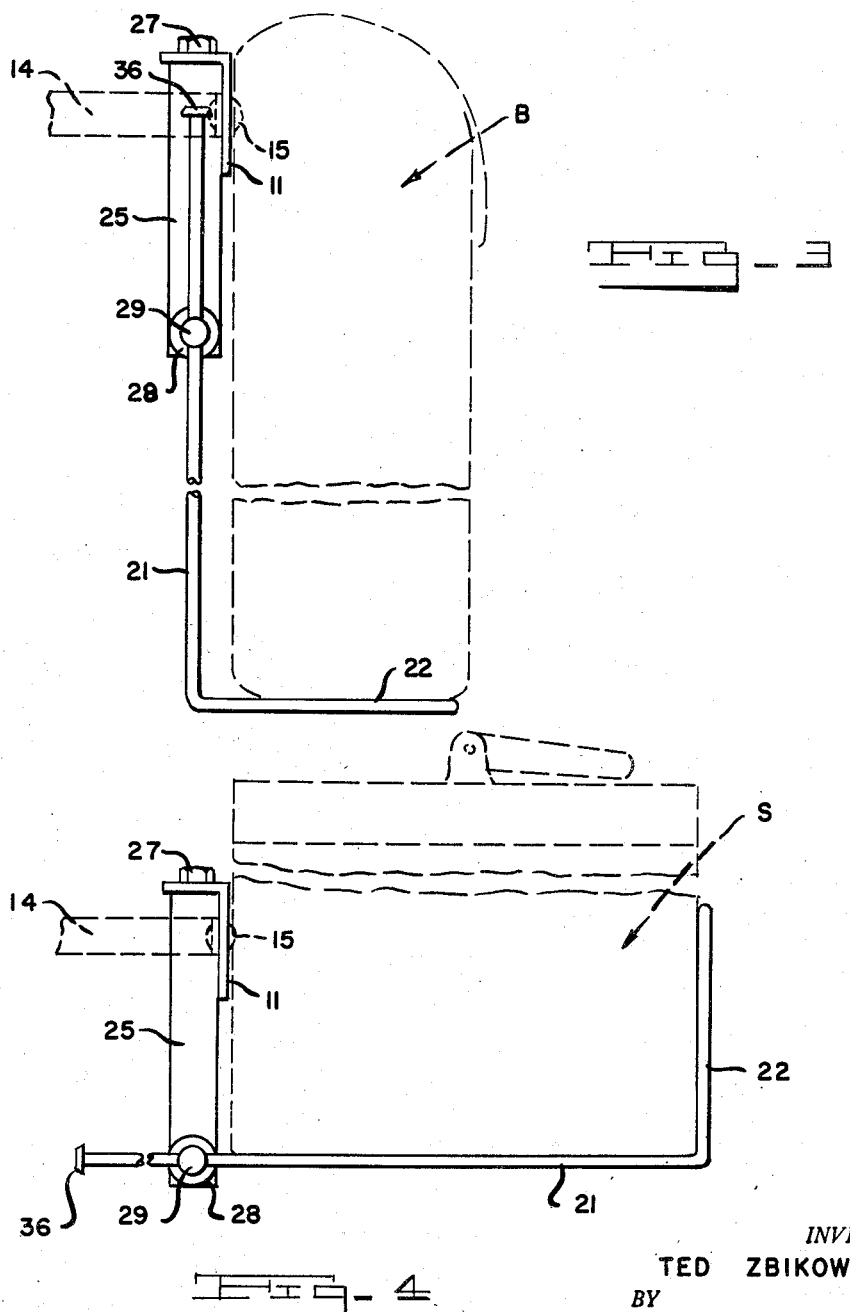
INVENTOR.
TED ZBIKOWSKI
BY
Cullen & Cantor
ATTORNEY

United States Patent Office 2,776,790
Patented Jan. 8, 1957

2,776,790

MOTORCYCLE LUGGAGE CARRIER

Ted Zbikowski, Detroit, Mich., assignor to Joseph Buegeleisen Company, Southfield Township, Michigan Application April 4, 1956, Serial No. 576,099

4 Claims. (Cl. 224—39)

This invention relates to luggage carriers for attachment to motorcycles or the like to support either saddle bags or in the alternative suit cases or boxes or the like.

Motorcycles and similar type vehicles are presently provided with brackets, usually near the back wheel, to which a saddle bag may be attached. In the conventional type of equipment, the saddle bag is provided with studs or other similar types of mechanical fastening means near the top of the bag so that the bag may be secured to the bracket and be suspended downwardly therefrom. Normally there is no provision made for the carrying of other boxes or suit cases or the like when the user of the vehicle wishes to use a container other than a saddle bag to carry various articles on his vehicle.

Thus, it is an object of my invention to provide a carrier which will support either the usual saddle bags or in the alternative, suitcases, boxes, or other similar type articles.

It is an additional object of my invention to provide a carrier wherein means are provided on the carrier for supporting the bottom of the saddle bag as well as for suspending the saddle bag from a bracket whereby the bag is properly supported to prevent the bag from being pulled when the bag is heavily loaded.

These and other objects of my invention will become apparent upon reading the following description of which the additional drawings form a part.

Referring to the drawings, in which:

Fig. 3 is a side view of the carrier showing a saddle bag in dotted lines in its supported position, and Fig. 4 is a side view of the carrier with a suit case supported thereon.

Figure 1:
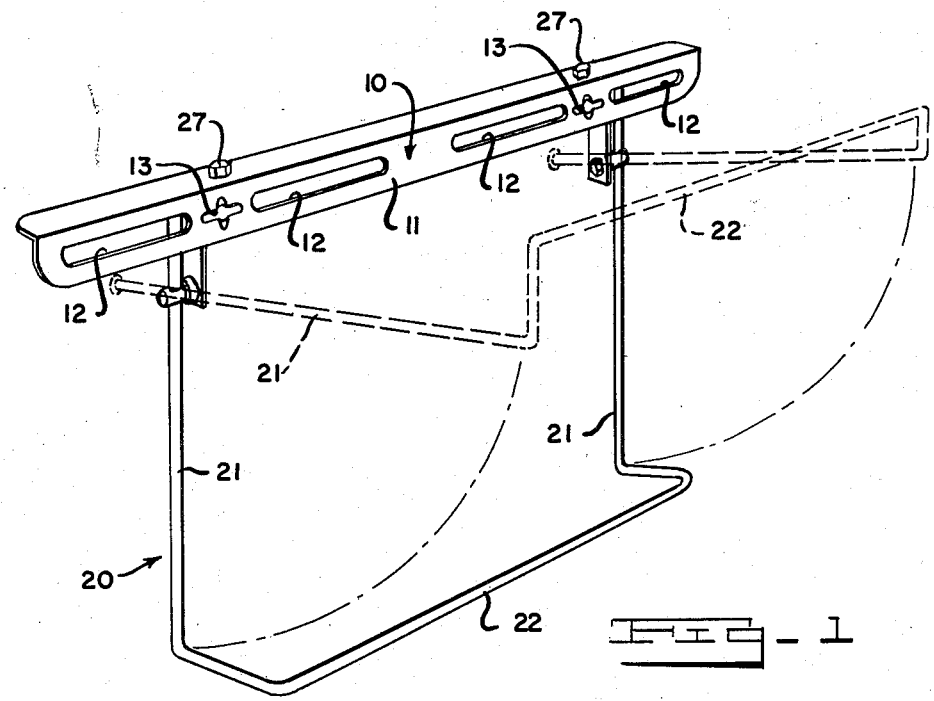
Fig. 1 is a perspective view showing the carrier in a saddle bag supporting position in dark lines, and in a suit case or the like supporting position in dotted lines.

With reference to the drawings, in which I show a preferred embodiment of my invention, I provide an angle bracket generally designated as 10 which is provided with a front downwardly extending flange 11 having a number of slots 12 formed therein. This bracket is secured to a frame work of any conventional type 14 by means of mechanical fastening means such as nuts and bolts 15 passing through the slots 12 in the angle bracket (see Fig. 3). Thus, the bracket 10 is supported on the motorcycle or other similar vehicle in the conventional manner and accordingly details of this construction and fastening are omitted.

The flange 11 of the bracket 10 is also provided with keyhole or similar type slots 13 through which the studs or the like of a conventional saddle bag B may be connected. The means for connecting the saddle bag B to the bracket 10 through the keyhole slot 13 is well known to those familiar with this art, and forms no part of this invention.

In the conventional type of construction, it has been found that when the bag is loaded with heavy objects the bag tends to become distorted and eventually loses its shape and begins to yield at the various sewn joints until the bag becomes useless. To avoid this problem, I provide a support frame, generally noted as 20, which is formed of a U-shaped wire frame having leg portions 21 and a base portion 22 which is formed by bending the base of the U and the immediately adjacent portions connecting with the leg portions 21, substantially normal to the plane of the leg portion 21. Thus, with reference to Fig. 3, it can be seen that the base portion 22 acts as a bottom support for the saddle bag to keep the saddle bag in good shape at all times regardless of how heavily loaded and, therefore prevent distortion and the resulting damage to the saddle bag.

The U-shaped frame is so connected to the bracket that it may be pivoted into a horizontal position as illustrated in Fig. 4 to support boxes or suitcases S or the like rather than the saddle bags which are normally carried on motorcycles. By means of this, the user of the motorcycle has a support, which is always available to him for use in supporting objects other than the saddle bags.

In order to attach the U-shaped frame 20 to the bracket, I utilize a flange construction 25 having an end connection portion 26 which abuts the horizontal flange of the bracket 10 which is secured to this flange by means of a mechanical fastening means such as a bolt and nut 27. The lower end of the flange 25 is provided with a socket 28, which in this case is a cylindrical sleeve cooperating with an opening formed in the lower portion of the flange 25.

A stud 29 is inserted in the socket so that the opposite ends of the stud extend beyond each side of the socket 28. One end of the stud is apertured at 30 so that a leg portion 21 of the frame may be inserted in the aperture and be held within the aperture. The opposite end of the stud 29 is threaded, as at 31 and is provided with a nut 32 or the like so that by tightening the nut on the thread 31, the stud apertured end is pulled towards and partially into the socket 28. This pulling effect of the stud locks the leg portion 21 against the outer face of the socket 28 to rigidly hold the leg portion 21 in any of its adjusted positions such as in the vertical or horizontal positions of Figs. 3 and 4 respectively.

In order to obtain a good support from the base portion 22 as a bottom support for saddle bags of various heights as well as to obtain a good side wall support from the base portion 22 when it is used to hold boxes or suitcases of varying widths, the leg portions 21 are slidable within the aperture 30 when the nut 32 is released. Thus, referring to Fig. 2, an arrow 35 indicates the directions of sliding motion relative to the apertured end of the stud 29. This sliding motion of the leg portion 21 can be obtained by loosening the nut 32 and adjusting the leg portion 21 within the apertured end of the stud and thereafter tightening the nut 32 to lock the leg portions in such a position as will give the desired distance between the base portion 22 and the bracket 10. In use for supporting saddle bags, this adjustment of length of the legs 21 will provide a good support for the base of a saddle bag regardless of how high the saddle bag is. Likewise, in the use illustrated in Fig. 4, the base portion may be moved to such a position as to provide a tight fit between the suit case S and the base portion 22 and cooperating bracket 10.

Figure 2:
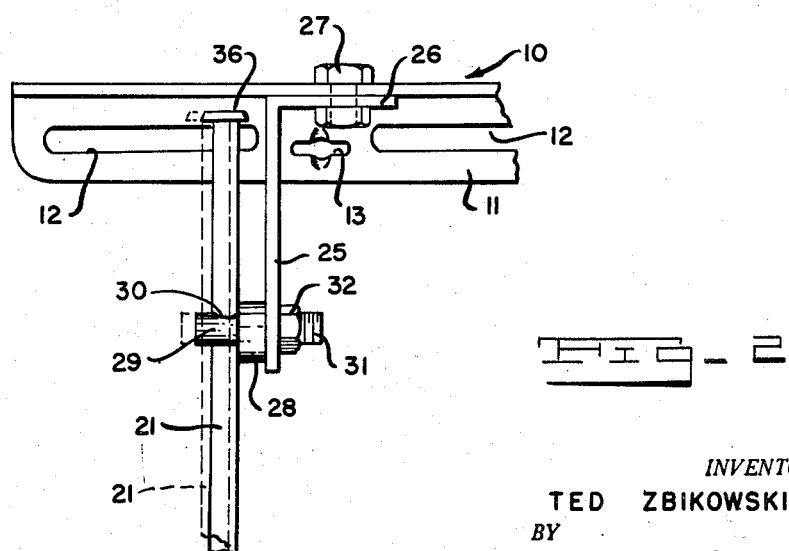
Fig. 2 is a rear view of the bracket shown in Fig. 1 and is illustrated in an enlarged fragmentary view.

As shown in Fig. 2, an enlarged head 36 is provided on the ends of the leg portion 21 to prevent the leg portion from completely slipping through the aperture 30 in the stud 29. Thus the enlarged head acts as a stop means and prevents accidental disassembly of the frame 20 relative to the bracket structure 10.

It can be seen, that I have provided a structure, which not only will support either saddle bags or suit cases or the like by merely adjusting the plane of the support frame, but which also is further adjustable so as to compensate itself for varying heights of saddle bags or various widths of suitcases or boxes to be supported thereon.

This invention may be further developed within the scope of the following attached claims. Accordingly, it is desired that the foregoing description be read as being merely illustrative of one opporative embodiment of my invention and not in a strictly limiting sense.

Having fully described at least one operative embodiment of my invention, I now claim:

1. A luggage carrier for motorcycles or the like comprising a U shaped frame formed of relatively stiff wire, the base portion of the U being bent into a plane substantially normal to the plane of the leg portions of the U; said frame being mounted for selective positioning in either a horizontal position with the base portion extending upwards as a side retaining wall or in a vertical position with the base portion extending horizontally as a support floor; the means for mounting said frame comprising a horizontally arranged bracket formed with means for attaching the bracket to a motorcycle or the like; the leg portions of the frame being connected to the bracket by a pair of pivotal connection means each grasping one of the leg portions and each rigidly connected to the bracket, with the pivotal connection means being angularly adjustable to hold the frame at the desired position relative to the bracket and having releasable locking means for locking the frame in the desired position.

2. A luggage carrier as defined in claim 1, and said leg portions being slidable within the connection means when the locking means are released to adjust the distance between the frame base and the bracket.

3. A luggage carrier as defined in claim 1, and wherein said pivotal connection means each comprise a socket rigidly secured to the frame, and a stud passing completely through the socket and having an aperture at one end thereof on one side of the socket to receive a leg portion of the frame, and the opposite end being threaded and having a cooperating nut means to draw the apertured side of the stud into the socket to thereby tighten the leg portion against the socket to prevent relative movement between the socket and the leg portion.

4. A luggage carrier as defined in claim 3 and said leg portions being slidable through their respective stud apertures when the nut means are released, for adjustment of the distance between the U frame base portion and the bracket.

References Cited in the file of this patent

FOREIGN PATENTS

| | | |
|---|---|---|
| 451,594 | Italy | Sept. 20, 1949 |
| 653,768 | Great Britain | May 23, 1951 |